United States Patent
Cotarmanac'h (10) Patent No.: US 8,095,957 B2
(45) Date of Patent: Jan. 10, 2012

(54) DEPENDENT DATA STREAM TRANSMISSION PROCEDURE

(75) Inventor: Alexandre Cotarmanac'h, Rennes (FR)

(73) Assignee: France Telecom, Paris (FR)

( * ) Notice: Subject to any disclaimer, the term of this patent is extended or adjusted under 35 U.S.C. 154(b) by 680 days.

(21) Appl. No.: 10/506,910

(22) PCT Filed: Mar. 7, 2003

(86) PCT No.: PCT/FR03/00754
§ 371 (c)(1),
(2), (4) Date: Jul. 11, 2005

(87) PCT Pub. No.: WO03/077561
PCT Pub. Date: Sep. 18, 2003

(65) Prior Publication Data
US 2006/0136440 A1 Jun. 22, 2006

(30) Foreign Application Priority Data
Mar. 8, 2002 (FR) .................................... 02 02992

(51) Int. Cl.
*H04N 7/173* (2006.01)
*H04L 12/28* (2006.01)
*H04L 12/56* (2006.01)

(52) U.S. Cl. ........ 725/116; 725/114; 725/118; 725/151; 370/392; 370/394

(58) Field of Classification Search .................. 725/116, 725/114, 118, 151; 370/392, 394
See application file for complete search history.

(56) References Cited

U.S. PATENT DOCUMENTS

| 6,205,140 | B1 * | 3/2001 | Putzolu et al. ................ 370/389 |
| 6,477,185 | B1 * | 11/2002 | Komi et al. .................... 370/536 |
| 6,606,329 | B1 * | 8/2003 | Herrmann ..................... 370/535 |
| 6,873,629 | B2 * | 3/2005 | Morris ........................... 370/535 |
| 7,000,245 | B1 * | 2/2006 | Pierre et al. .................... 725/136 |
| 7,009,967 | B1 * | 3/2006 | Hariharasubrahmanian . 370/389 |
| 7,024,685 | B1 * | 4/2006 | Foster et al. ................... 725/151 |
| 2001/0027468 | A1 * | 10/2001 | Okura ........................... 709/202 |

(Continued)

FOREIGN PATENT DOCUMENTS
EP    1113614  A2    7/2001
(Continued)

OTHER PUBLICATIONS

C. Herpel et al., "MPEG-4 Systems: Elementary Stream Management," XP-000885367, Elsevier Science Publishers B.V., 2000, pp. 299-320.

(Continued)

*Primary Examiner* — Brian Pendleton
*Assistant Examiner* — Pinkal R Chokshi
(74) *Attorney, Agent, or Firm* — David D. Brush; Westman, Champlin & Kelly, P.A.

(57) ABSTRACT

A method for the transmission of data flows; data flows, server, terminal, method for reception and use corresponding thereto. The invention relates to a method for the transmission of at least one flow of data towards at least one terminal, said flow or flows being organized in the form of flow units, characterised in that at least some of said flow units comprise at least one pointer pointing towards at least one flow unit of said flow or another flow in order to optimize processing in the terminal and/or the useful flow rate of said flow(s).

22 Claims, 4 Drawing Sheets

U.S. PATENT DOCUMENTS

2002/0071434 A1* 6/2002 Furukawa ............... 370/392
2002/0131417 A1* 9/2002 Sandell ............... 370/395.1
2004/0237122 A1* 11/2004 Yamaguchi et al. ........ 725/136

FOREIGN PATENT DOCUMENTS

EP 1133189 A2 9/2001
WO WO 00/04723 1/2000

OTHER PUBLICATIONS

Susie J. Wee et al., "Secure Scalable Streaming Enabling Transcoding Without Decryption," XP-001104045, IEEE, 2000, pp. 437-440.

V. Bottreau et al., "A Fully Scalable 3D Subband Video Codec," IEEE, 2000, pp. 1017-1020.

Chiariglione, L. International Organisation for Standardisation, "Coding of Moving Pictures and Audio," ISO/MPEG4 : m9291 SL extension (meeting date : Jul. 22, 2002): publication date Jul. 15, 2002 (One week before the meeting).

Chiariglione, L. International Organisation for Standardisation, "Coding of Moving Pictures and Audio." ISO/MPEG4 : m8686 SL extension (meeting date Dec. 9, 2002): publication date Nov. 27, 2002 (One week before the meeting).

International Search Report dated Jul. 17, 2003 for corresponding International Application No. PCT/FR03/00754, filed Mar. 7, 2003.

English Translation of International Preliminary Report on Patentability dated Oct. 1, 2003 for corresponding International Application No. PCT/FR2003/000754, filed Mar. 7, 2003.

* cited by examiner

DEPENDENT DATA STREAM TRANSMISSION PROCEDURE

CROSS-REFERENCE TO RELATED APPLICATION

This application is a Section 371 National Stage Application of International Application No. PCT/FR03/00754, filed Mar. 7, 2003 and published as WO 03/077561 A1 on Sep. 18, 2003, not in English, which is based on French application No. FR 02/02992, filed Mar. 8, 2002.

FIELD OF INVENTION

The domain of the invention is that of data transmission in the form of one or several data streams, each composed by elementary stream units. More specifically, the invention relates to the optimisation of the processing of these elementary stream units when the latter are dependent from, or related to, one or several other stream units.

BACKGROUND OF THE INVENTION

When a signal, for example, a multimedia-type signal, is transmitted over a single channel in a synchronous manner, the processing of a stream unit (arises few or no problems). The necessary data is received previously.

On the other hand, this is not the case in asynchronous systems that can implement several transmission channels, and/or several servers—each transmitting a part of the desired signal. This is the case, for example, in the transmission or broadcasting over an IP-type network.

In this case, we may receive a stream unit that is supposed to complete others that have not been received. For example, this could be data enrichment information of a higher hierarchical level, in which the data is encoded using hierarchical encoding (a stream can therefore correspond to a given hierarchical level.) The processing of enrichment data will therefore give a random result, generally leading to significant degradation of a recovered signal, or even the complete blocking of the decoder.

The previous art in terms of multimedia synchronisation is essentially represented by RTP-based transport protocols and by MPEG-4 (Synchronisation Layer.) In the approached used, the synchronisation mechanisms have been mainly designed for temporally synchronising audio and video streams so that they may be presented without lags. This data is conveyed using a time stamping system (a reference clock, and decoding and presentation stamps.)

With the advent of hierarchical encoding, where various time and spatial enrichment levels are used to produce a presentable frame, the inventor has noted that a new need for synchronisation arises.

Indeed, streams must be synchronised before they are decoded (and not only during their presentation.) This constraint is more complex than presentation synchronisation because the units required for decoding the unit must be identified in order to produce a correct frame. A single lag can lead an entire stream as well as all the streams that are based on it to be unusable. This is a new, not apparent, problem identified by the inventor.

A similar problem arises when a received stream unit must be decoded, or decrypted, using data (for example, a decoding key) that the terminal should have received, but has not received. Once again, the result of the decoding procedure will be, at least, inefficient, generally harmful (in terms of recovered signal), and can lead to the blocking of the terminal. In these two cases, an undesired and troublesome process would have been performed.

Another significant problem found in broadcasting (multicast or broadcast) systems is that the same data has to be multibroadcasted to allow users connecting at any instance to receive all the stream(s) that they have selected. This specific aspect is already discussed in the request for patent EP-014600462, not yet published, in the name of the title holders of the present request for patent. According to this technique, processing is performed at transport level, which forces a processing of each stream unit, taking into account the specificities of the various transport types.

The previous art in terms of multimedia representation in broadcast and multicast scenarii is described in the specification of the "carousel MPEG-4. Nonetheless", therefore, a certain number of functions are prohibited or become high data rate consumers. In the two delivery scenarii considered, input points to the multimedia presentation must be indicated at any time. This is translated into a repetition of data relative to the description of the scene: BIFS scene, textures.

Once the multimedia content becomes rich, this simple repetition is not unacceptable and leads to excessive downloading times. Furthermore, this specification does not allow broadcasting certain multimedia elements (short audio/video clips.)

In particular, the purpose of the invention is to overcome various inconveniences of the state of the art.

SUMMARY OF THE INVENTION

More specifically, an object of the invention is to provide a technique that permits to manage efficiently stream units when the latter depend on, or are related to, one or several other stream units.

Furthermore, an object of the invention is to provide such a technique, which allows the management of linked streams, in particular, in the case of data an encoded by hierarchical encoding or encoding that includes encoding that associates base data and enrichment data.

Another object of the invention is to provide such a technique, which permits to optimise the transmission of multibroadcast scenarii, and in particular, to reduce the resource quantity used, without reducing the quality of the reception.

The purpose of the invention, in other words, is to optimise the processing performed in the terminals, both in terms of quantity and quality.

These objectives, as well as others that will be indicated below, are reached according to the invention using a transmission procedure of at least one data stream to at least one terminal, in which the stream(s) are organised into stream units. According to the invention, at least some of these stream units include at least one pointer that points to at least one stream unit of said stream or of another stream that may have been received previously in a terminal, called required previous unit, in order to avoid performing the processing of this stream unit within said terminal if the required previous unit(s) is(are) not received.

Thus, a logical synchronisation system is available, which permits an easier management of stream units, limiting the processing in terminals, to improve the resolution quality, etc.

The format of data thus defined, according to the invention, can also be implemented not only for the transmission and reception of streams, but also for their broadcast, their recording and their storage.

The invention is therefore based, in particular, on the identification of the new problem of "back" synchronisation of streams or stream units, and on the unapparent observation that the most efficient solution is not to process the stream units when not all the elements to do so are available. Indeed, it appears to be preferable, in terms of signal recovery, to ignore a stream unit rather than decoding it, which would lead to a degradation of the recovered signal, or even the blocking of the terminal.

As an advantage, the procedure of the invention includes the transmission of a least two data streams that are transmitted separately, one stream unit of an initial stream pointing to at least one required previous unit of at least one second stream, in which said stream unit of the initial stream includes enrichment data of the data contained in said second stream (s.)

In this case, these data streams can advantageously correspond to different hierarchical levels of a hierarchical encoding, in which the processing of a stream unit of a given hierarchical level is only done if the stream units of the corresponding lower hierarchical level(s) have been received.

This stream unit can point to at least one previous unit, which defines a sequence of required previous units.

According to an advantageous characteristic of the invention, at least one of these pointers allows finding at least one required previous unit that includes data that allows the decoding and/or decrypting of the considered stream unit.

Preferably, said required previous unit(s) include(s) data that allows a terminal to decide whether the data of a considered stream unit must be decoded and/or decrypted, then displayed after decoding.

According to another advantageous implementation, at least one of these pointers points to data that can be known from said terminal, so that the terminal can decide on its capacity or incapacity to process the corresponding stream unit.

Advantageously, according to another aspect of the invention, at least one of these stream units includes at least one pointer that points to at least one stream unit of said stream or another stream than can be received in the near future.

Preferably, this or these stream units that can be received in the near future have a marker that allows creating a link with said pointer(s.)

Thus, advantageously, the pointers of at least two similar stream units transmitted at distinct times can point to the same stream unit that may be received in the near future.

Preferably, the procedure of the invention implements an indicator that indicates the role of the pointer(s) from among at least two roles that belong to a group that includes:

the designation of at least one previous stream unit that must be decoded to allow the taking into account of the considered stream unit.

the designation of at least one previous stream unit that includes the required data to decode and/or decrypt the considered stream unit, and/or a reference to a protection system status.

the designation of at least one subsequent stream unit.

Advantageously, at least some of these data streams include a dependency descriptor that defines this role.

Advantageously, at least some of these data streams include a dependence marker, which allows its identification as a required previous unit and/or an identification marker of said stream unit in said stream.

Preferably, the procedure of the invention is implemented at the synchronisation level, so that no preliminary processing of a received stream unit is necessary.

The invention also relates to one or several data streams transmitted according to the transmission procedure described above. As mentioned, such a data format can be used for transmission, broadcasting, reception, and recording (for example, using a video recorder or optical disk recorder) and the storage of data (for example, on a CD-ROM, a tape, a remote server, etc.)

Also note that the invention permits to combine easily several of these aspects. For example, some data streams can be broadcast, and others provided on CD-ROM, or through a server, in which the second ones must be known in order to decode (or optimise) the first ones.

Such a data stream is organised into stream units that are transmitted independently from each other, in which at least some of these stream units include at least one pointer that points to at least one stream unit of said stream or to another stream that may have been received previously in a terminal, called the necessary previous unit, so that processing of said stream unit is not performed in said terminal if the required previous unit has not been received.

The invention also relates to servers for data designed to be transmitted to at least one terminal in the form of at least one data stream organised into stream units that are transmitted independently from each other, in which at least some of these stream units include at least one pointer that points to at least one stream unit of said stream or to other streams that may have been previously received in a terminal, called the previous necessary unit.

The invention also relates to terminals that can receive at least one data stream organised into stream units transmitted independently from each other, in which some of these stream units include at least one pointer that points to at least one stream unit of said stream or of another stream that may have previously been received in a terminal, called a previous necessary unit.

The invention also relates to reception procedures of at least one data stream organised in stream units transmitted independently from each other, in which some of these stream units include at least one pointer that points to at least one stream unit of said stream or of another stream that may have previously been received in a terminal, called a previous necessary unit, and the reception procedure includes the following stages:

analysing said pointer(s) of a stream unit.

processing said stream unit if the said required previous unit(s) have been received.

Lastly, the invention relates to the use of the transmission procedure, in particular, for one of the applications belonging to the group that includes:

systematic broadcasting of a message before accessing a program selected by the user.

conditional access to a specific quality level and/or a specific option of a program.

interactive television.

Other characteristics and advantages of the invention will become clearer upon reading the following description regarding a preferred embodiment of the invention, given as an illustrative example.

DETAILED DESCRIPTION OF THE PREFERRED EMBODIMENTS

The preferred embodiment described below relates, in particular, to the transmission of stream in a multimedia system, in particular an MPEG4-type system.

Recalls of the Previous Technique:

The previous technique does not allow taking into account efficient transmission (in terms of bit rate and functionality) of multimedia scenes in multicast or broadcast scenarii nor the synchronisation of interdependent streams of elements linked to access control key type content.

Multimedia Representation in Broadcast and Multicast Scenarii

A solution is proposed in the "carousel MPEG-4" specification. Nevertheless, some functions are prohibited or become high bit rate consumption functions. In the two delivery scenarii considered, the input points to the multimedia presentation must be indicated at any times. This results in the repetition of data relative to the description of the scene: BIF scene, textures, etc.

As soon as the multimedia content becomes rich, this simple repetition is unacceptable and leads to excessive downloading times. Furthermore, this specification does not allow broadcasting some multimedia elements (short audio/video clips.)

Furthermore, in the unpublished request for patent EP-014600462, the data were conveyed at the transport level. In contrast, according to the invention, everything is located at the so-called synchronisation layer level, which is independent from the transport level.

This provides the advantage to get rid off the various types of transport and to unify the time and logical synchronisation data, as well as the random access markers in a single point, which allows calculating at a unique point, the decision to keep or discard the unit. This leads to further knowing more information regarding the stream, which allows specialising decisions by type of stream (of interest for video/audio with respect to BIFS, etc.)

Multimedia Synchronisation

The previous art in terms of multimedia synchronisation is essentially represented by the transport protocols based on RTP and by MPEG-4 (Synchronisation Layer.) In the approach used, the synchronisation mechanisms used were mainly designed to time synchronise an audio stream and video stream so that they can be presented without lags. These datas were conveyed by using a time stamp system (reference clock, decoding and presentation stamps.)

With the advent of hierarchical encoding where the various levels of time and spatial enrichment are used to produce a presentable frame, a new synchronisation need arises. Indeed, it I necessary to synchronise the stream before decoding it (and not only at its presentation.) This constraint becomes more complex than the presentation synchronisation because it is necessary to identify the units that are needed for decoding a unit in order to produce a correct frame. A single lag can lead an entire stream, as well as any streams based on the latter, to be unusable. As can be seen, this is a problem of logical dependence between units to be decoded.

A reduced time interval is already taken into account in video MPEG-4, but it is not accessible at the system layers.

Data Protection

A third case of synchronisation is not considered in the previous art: that of the synchronisation of a data protection stream linked to a multimedia stream.

In this case, it must be ensured that any multimedia stream unit will be decrypted using a correct key before being decoded (otherwise, the results may be catastrophic.) As soon as the streams are not guaranteed to be synchronous, the synchronisation tools cannot ensure this.

This time, the input of the decoder and its output are synchronisation points (the decoded frame can, in turn, be encrypted.)

Principles of the Invention

The aims of the invention are, notably, to allow:
the multicast and broadcast of multimedia scenes.
the logical synchronisation of multimedia decoding.
This is obtained using signalling mechanisms that permit to reach these two objectives:
  A mechanism that allows configuring a stream so that each time unit making up the stream is identified in a configurable manner.
  A front chaining mechanism for broadcast scenarii.
The essential technical elements of the invention are therefore:
  Logical synchronisation elements between elements of several streams or within the same stream (video, audio, and data protection system.)
  The solution allows, for each element type of the stream, indicating the element on which it depends, and the specific elements on which it depends. Several implementations are possible.
The following is notably used, for any type of implementation:
Dependency Descriptor
Dependency Marker (optional)
Dependency Pointer
Marker (identifies the stream unit) (optional)

DETAILED DESCRIPTION OF AT LEAST ONE EMBODIMENT MODE

MPEG4 Specification

Appendix 1 presents a detailed example of the implementation of the invention for MPEG-type data, in the form of an MPEG-4 specification.

Receiver Behaviour

The terminal receives an IOD (InitialObjectDescriptor) that references, using their descriptors (ObjectDescriptor,) at least one graphical scene object (BIFS stream: F_BIFS) and, optionally, it references at least one graphical object description object (OD stream: F_OD.) The terminal will open these streams based on the information presented below.

Each of these object descriptors contains an elementary stream (ES) descriptor that composed it (ESDescriptor.) Each ESDescriptor contains a dependsOnESID field and an SLConfigDescriptor.

The dependsOnESID field allows constructing the graph of dependencies between streams identified by their ESID.

The SLConfigDescriptor object allows configuring the synchronisation tools.

Within the SLConfigDescriptor object, there exists the possibility of configuring the receiver so that it verifies the various dependencies in the following manner:

```
    DependencyMarker    //allows configuring the stream
in order to identify its packets.
    {
        int(5)maker Length;
    }
    DependencyDescriptor    //allows describing the
dependency links.
    {
    int(2)mode;    //0: version mode by DTS
                   //1: version mode by ID
                   //2: scalable mode
                   //3: IPMP mode
                   //if mode==1 the dependency is
done % at a marker in the stream.
                   //if mode==3 the dependency is
done in an opaque manner (the IPMP system must understand
                   // the dependency and validate
or not the decoding/decrypting.
                   // possibly, by using a
marker. It is therefore a code
                   // that allows the protection
system to know whether it is a
                   // decryptable unit or not
                   //if mode==0 or mode==2, the
dependency is calculated over the DTS
                   // consequently,
depLength=dtsLength in the corresponding SLConfig.
        int(5)depLength;
        if(mode==1 ||mode==0)
        {
            int(depLength)value;//value of the first
unit to search.
        }
    }
```

Thus, a stream can be declared dependent of another stream (itself a normal media or IPMP.) In this case, it describes, in its SL configuration, how it will indicate this dependency (Dependency descriptor) using four distinct modes:

DTS and ID Version Mode (modes 0 and 1):

The stream will indicate for each of these AccessUnits (AU) a front dependency in the stream itself. In other words, the AU(n) indicates which AccessUnit will be decoded next. This signalling is done by the mean of a marker in each packet that describes either in mode 0 the DTS of the next Access Unit (unique) or the ID of the next Access Unit in mode 1.

In this case, the value of the first element to be recovered is added.

For example, this could be a BIFS stream in broadcast/multicast mode.

Scalable Mode (Mode 2):

The stream will indicate for each of these Access Units a dependency with respect to a stream on which it depends. This stream is assumed to be unique.

Figure 1:
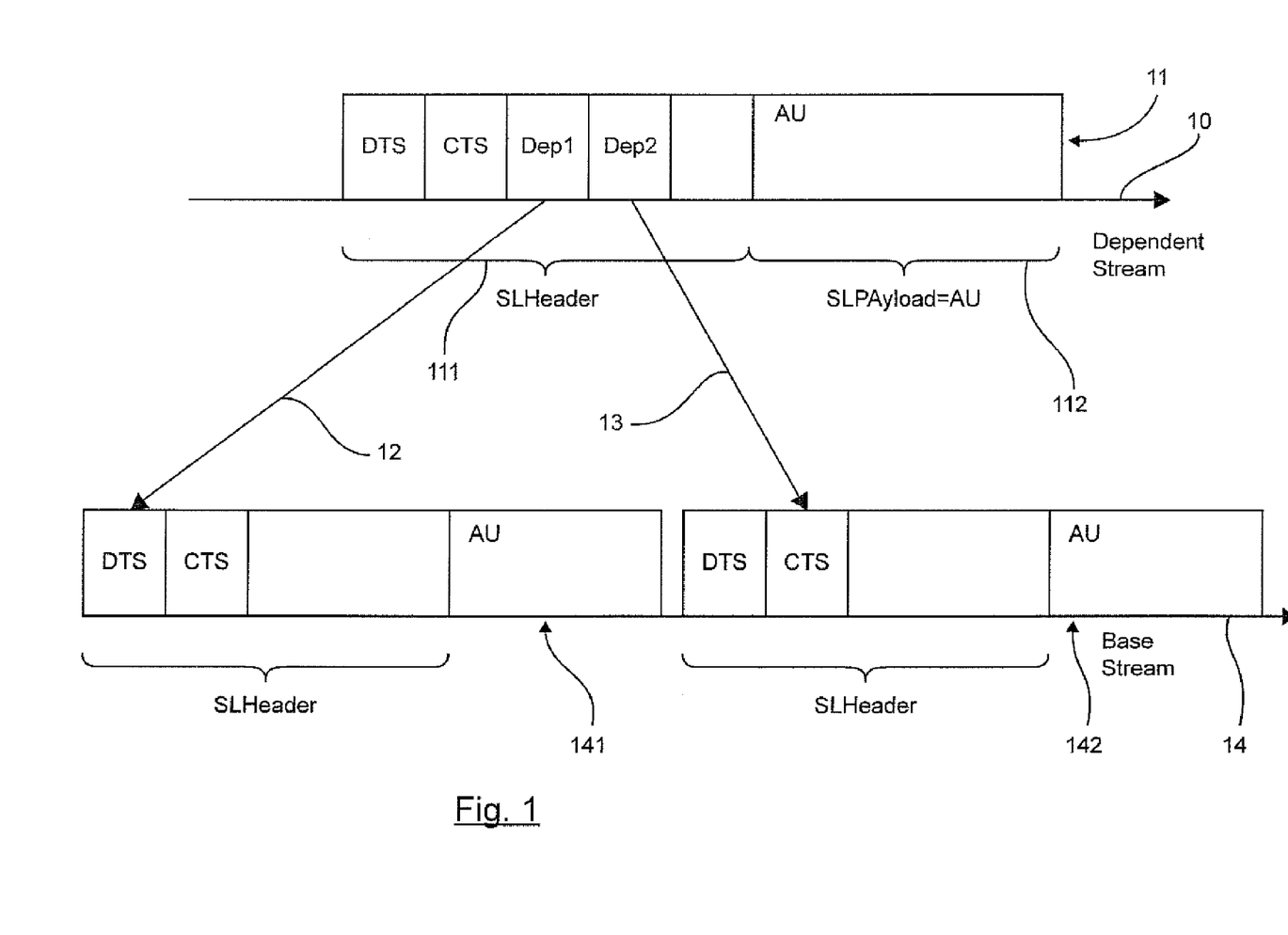
FIG. 1 illustrates the principle of the dependence management of a data stream with respect to another, according to the invention.

This principle is illustrated by FIG. 1. The stream unit 11 of a dependent stream 10 normally includes a header (SL-Header) 111 and a data field (SL payload) 112. The header 111 includes, in particular, two pointers, Dep1 and Dep2, which define the dependency links 12 and 13 with stream units 141 and 142, respectively, of a base stream 14, which must be known in order to process the stream unit 11.

IPMP Mode (Mode 3):

The stream will indicate, for each of these AccessUnits, an identifier that allows the data protection system to decode the unit. This one given, this marker can respond whether it is able to decrypt the unit or not.

The SLConfigDescriptor can contain one or several DependencyDescriptor and one or several Dependency-Marker, which allows adjusting the various dependency cases in the stream. (A priori, a single DependencyMarker is enough, but there may be several present.)

Thus, if the SLConfig contains DependencyMarker, it will indicate a version ID for each of its packets (modes 1 and 3).

In the header of the SL packet corresponding to an Access Unit, it will be found the following:

For each dependencyMarker of the SLConfigDescriptor, a length marker (markerLength.)
   For each DependencyDescriptor, a dependencyPointer of depLength length.

Once these various markings are performed, the system can:

a) operate in "broadcast" mode thanks to modes 0 and 1.
   b) Manage the scalability dependencies
   c) Manage the IPMP dependencies and the combination of a), b), and c).

Operating Description in IPMP Mode

When the ObjectDescriptor of the object is received, the terminal checks the SLConfigDescriptor of each of the related streams. This will allow decoding the header of the SL packets for each of the streams; in particular, decoding the markers.

Figure 3:
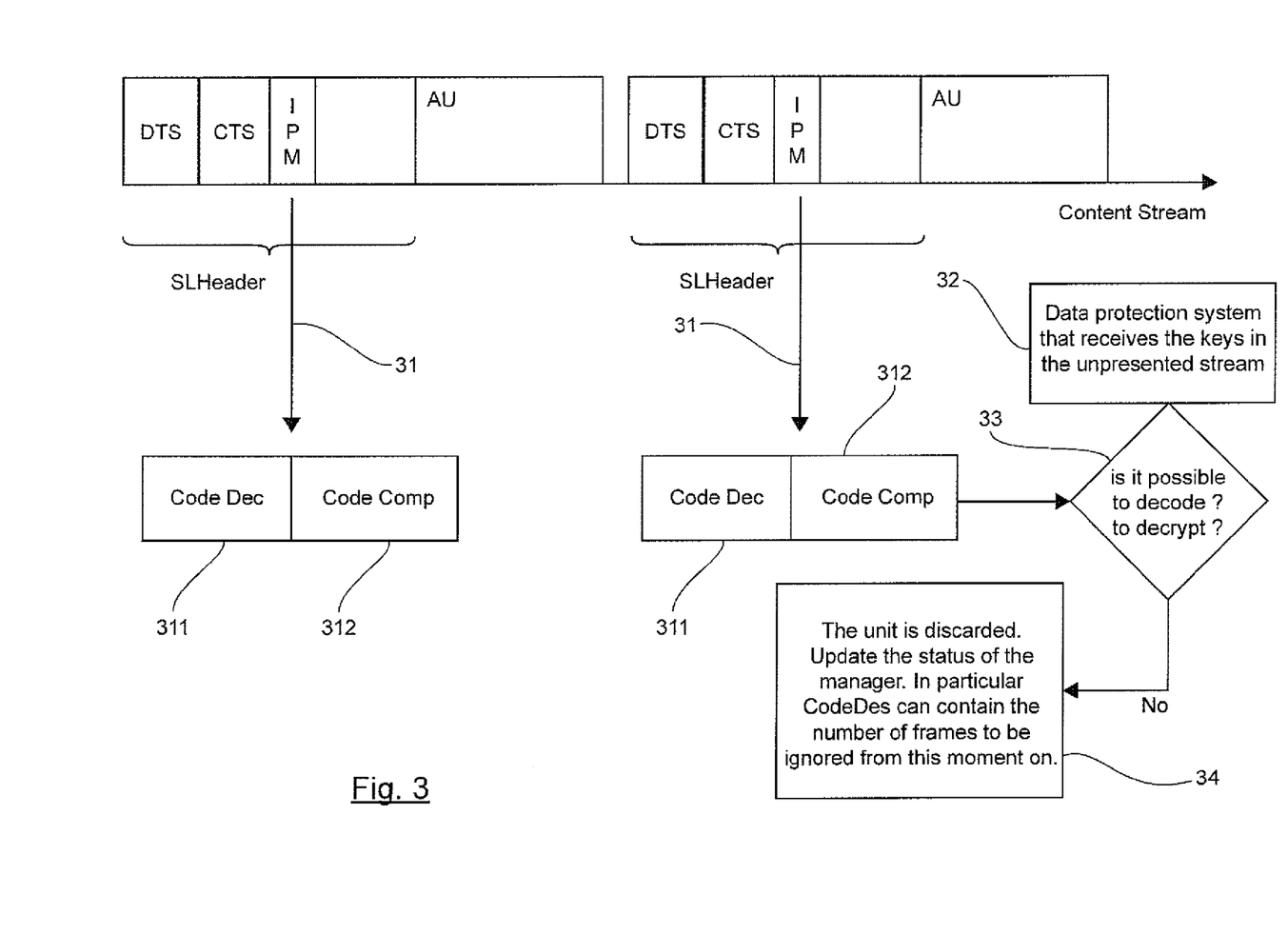
FIG. 3 illustrates the case of a synchronisation linked to the decoding or decrypting of a stream unit (IPMP.)

In IPMP case, there will be DTSs and/or dependencyPointers, as illustrated in FIG. 3.

For each stream AU, before it is decoded, it is processed by the IPMP system 32, by providing it with at least the following stream identifier data: ESID, DTS, dependencyPointer (IPM) 31. The IPMP system then responds (33) if it can process (decrypt) the AU by taking into account the information 311 (Code Dec) regarding the decoding. If it is not the case, and the DTS of the unit expires, the AU is destroyed (34.) Therefore, there is no attempt to decode inconsistent AUs.

Figure 4:
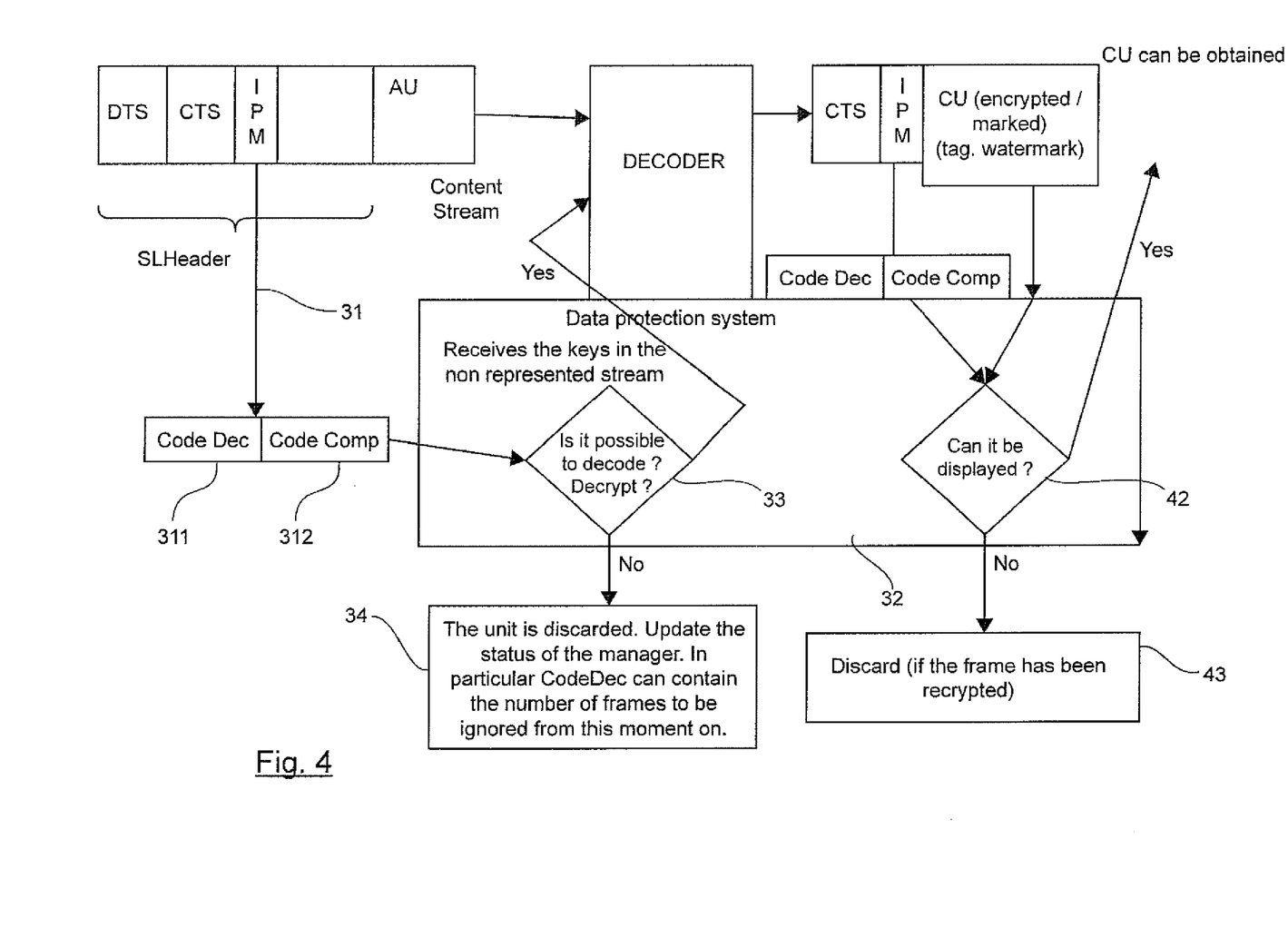
FIG. 4 presents an alternative of the case in FIG. 3, with two protection points (decoding and rendered.)

In the example of FIG. 4, on one hand, there are the elements of FIG. 3, and on the other hand, there is a process linked to image recovery, after its decoding 41. Indeed, using field 312 (CodeComp,) the data regarding the composition, such as the addition of a tattoo or of a message on the image, can be transmitted. If the data protection system 32 does not know how to manage this composition (it does not know how to display the image (42),) for example, because the decoder does not have the required tattoo, the image is not displayed (43.)

It can also be foreseen that the frame will be marked, for example, with a logo, which disappears if the decoder has the correct key.

Operating Description in Multicast/Broadcast Mode

Figure 2:
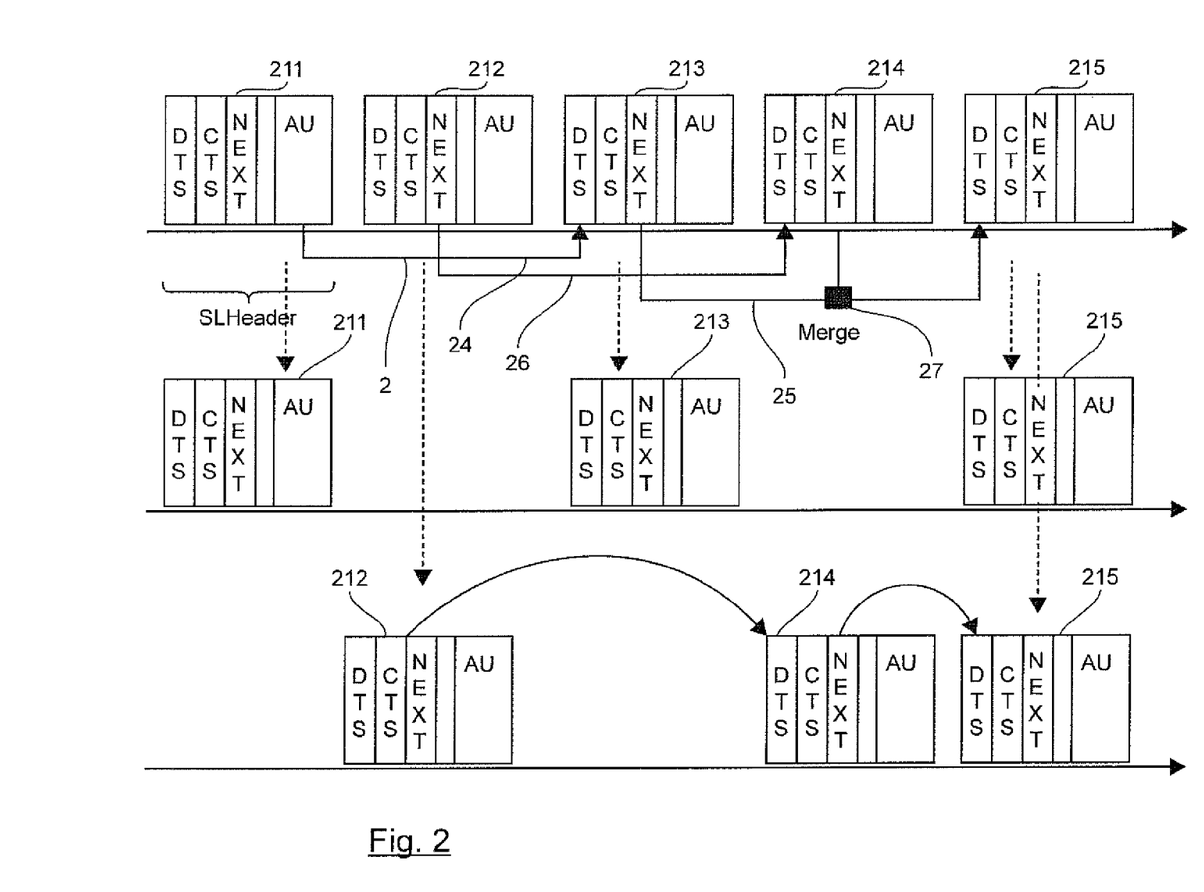
FIG. 2 presents an implementation of the invention, in the case of the broadcasting of a stream (broadcast) and its reception by two terminals, in the form of time-staggered sessions.

This operating is illustrated in FIG. 2, which presents the following:

the transmitted stream 21.
   the stream received by a first receiver (session 1) 22.
   the stream received by a first receiver (session 2) 23.

Session 1 starts at packet 211, then takes into account the stream unit 213, to which the stream unit 211, then the stream unit 215 points (24), according to link 25.

Session 2 opened a little after, starts with stream unit 212, which points (26) to stream unit 214.

According to the invention, two (or more) stream units can point to the same next stream unit. It is the merge mechanism 27: stream units 213 and 214 both point to stream unit 215. Thus, although they were started at different times, the two sessions use, after a "recovery" phase, the same stream units 215. This clearly allows improving performance.

This operating is specifically described.

When the ObjectDescriptor is received, the terminal checks SLConfigDescriptor for each of the related streams.

This allows decoding the SL packet header for each of the streams; in particular, decoding the markers.

In the case of Multicast/Broadcast, therefore, there will be for the DTSs, at least one dependencyPointer in mode 0 or 1, and a marker (mode 1 "by ID".) The terminal therefore knows which is the first unit to be recovered is for each of the streams. Therefore, it will attempt to recover the first unit corresponding to each stream.

If it receives the first unit, then it can begin to display the contents. Each unit describes in the dependencyPointer, the next unit to be received, and the DTS/marker, identifies each unit in a unique manner.

If the terminal does not receive the first unit (it can be aware of this by using a time out or when it receives an RAP=1 type for this stream unit that does not correspond to the desired marker). It disconnects (full closing of the session) and tries to reconnect.

Note that this mechanism takes into account the merger of sessions.

Also note that the mode "by ID" is required when the DTS of the next unit is not known in advance.

This mechanism is used in particular for BIFS, OD, Textures, audio clips, and video clips in MPEG-4. It will no longer be used for streamed audio/video.

Operating Description in Scalable Mode

When the ObjectDescriptor is received, the terminal checks the SLConfigDescriptor for each of the related streams. This allows decoding the SL packet header for each of the streams. For scalable video, one stream will be used as a base, and one or several other streams will depend on this stream. Each stream that depends on the base stream will declare a DependencyDescriptor.

For each AU of the improvement stream, it will reference using the dependencyPointer of the AU DTS of the base stream on which it depends.

In most cases, there will be two dependencyPointer in the improvement stream in order to point to the two reference AUs of the base video.

Operating Description in the Broadcast+IPMP Mode

In this case, BIFS, for example, will contain two dependencyDescriptor in the SL configuration. One for the broadcast mode, one for IPMP. It will contain a marker if the broadcast mode is by ID.

Application Examples

Broadcasting an Advertisement Before Starting a Program

In several occasions in Internet streaming, content providers systematically send an advertisement before sending the content itself. Because Internet scenarii is unicast (client-server,) this is done in phases: downloading of the advertisement, and the end of the advertisement leads to the launching of the video streaming.

In a multicast or broadcast scenario, where there is no recourse to a client-server operating, there is no notion of request. As such, the user normally only has access to the current status of the presentation.

Thanks to the front reference mechanism, this scenario becomes possible in multicast or broadcast.

Indeed, the advertisement can be sent in a cyclical manner and the current program can be merged at the end of the advertisement.

This allows ensuring, for example, that all users will view the advertisement at the beginning (during this time, the content can then be downloaded in a efficiently and incremental way.) The same types of applications can be, for each broadcast film, a notification of the category of the film (parental guidance, less than 16 years of age, etc.)

Scalable Conditional Access

The idea here is to send the same video and audio stream (unique) that can be viewed differently depending on the rights of the user. The signalling of the video frame dependencies, with respect to the protection keys, allows decoding only the ones for which the user has the keys. All images can be decoded for the one whose got all keys—some images for the one having less privileges, etc. This allows creating conditional access in a more scalable manner (time scalability here.)

The most complex and useful scenario is one in which there are several streams and where the time scalability and resolution can be tuned.

With this frame dependency system, it is therefore possible to modulate access to media in an almost continuous manner.

Therefore, it can be imagined that some users would have keys that allow receiving sound over 5 channels (spatial sound) and others that allow only receiving stereo sound. This also allows more detailed invoicing.

MPEG-4 Interactive Television

Instead of considering that the "set-top box" application is static, it can be considered that any of these types of applications are MPEG-4 applications that allow obtaining different channels (inline mechanism.) This MPEG-4 application would be active 24 h×24 h and would permit to reconfigure entirely graphical interfaces, etc.

The scene broadcasting techniques would allow efficiently downloading the graphical interface (BIFS/Textures/OD) as well as the application part (MPEG-J.)

This allows a quicker deployment.

APPENDIX

Example of an MPEG-4 Type Specification According to the Invention

DEFINITIONS

Stream Unit (AU: Access Unit)

A data unit that is accessible individually in an elementary stream. A stream unit (or access unit) is the smallest entity to which a time data element can be attributed.

Audiovisual Object

A representation of a natural or synthesised (virtual) object that is manifested in an audio and/or visual manner. The representation corresponds to a node or group of nodes in the BIFS sequence description. Each audiovisual object is associated to zero, one, or several elementary streams that use one or several object descriptors.

Audiovisual Sequence (AV Scene)

A series of audiovisual objects with data elements that describe the scene and define their spatial or time attributes, including the resulting operations of the object and user interactions.

Binary Format for Scene (BIFS)

A coded representation of a parametric scene description format.

Terminal

A system that sends or receives and presents the coded representation of an interactive audiovisual scene like the one defined by ISO/IEC 14496-1. It can be an independent system or be part of an application system compliant with ISO/EIC 14496.

| Abbreviations and Symbols | |
|---|---|
| AU | Access Unit, or Stream Unit |
| AV | Audio-visual |
| BIFS | Binary Format for Scene |
| CM | Composition Memory |
| CTS | Composition Time Stamp |
| CU | Composition Unit |
| DAI | DMIF Application Interface (see ISO/IEC 14496-6) |
| DB | Decoding Buffer |
| DTS | Decoding Time Stamp |
| ES | Elementary Stream |
| ESI | Elementary Stream Interface |
| ESID | Elementary Stream Identifier |
| FAP | Facial Animation Parameters |
| FAPU | FAP Units |
| NCT | Node Coding Tables |
| NDT | Node Data Type |
| OCI | Object Content Information |
| OCR | Object Clock Reference |
| OD | Object Descriptor |
| ODID | Object Descriptor Identifier |
| OTB | Object Time Base |
| PLL | Phase Locked Loop |
| QoS | Quality of Service |
| SDM | System Decoder Model |
| SL | Synchronisation Layer |
| SL-Packet | Synchronisation Layer Packet |
| SPS | SL-Packetised Stream |
| STB | System Time Base |
| TTs | Text-to-Speech |
| URL | Universal Resource Locator |
| VOP | Video Object Plane |
| VRML | Virtual Reality Modelling Language |

SL Packet Header Configuration
Syntax

```
class SLConfigDescriptor extends BaseDescriptor : bit (8)
tag=SLConfigDescrTag {
  bit (8) predefined;
  if (predefined=0= {
    bit (1) useAccessUnitStartFlag;
    bit (1) useAccessUnitEndFlag;
    bit (1) useRandomAccessPointFlag;
    bit (1) hasRandomAccessUnitsOnlyFlag;
    bit (1) usePaddingFlag;
    bit (1) useTimeStampsFlag;
    bit (1) useIdleFlag;
    bit (1) durationFlag;
    bit (32) timeStampResolution;
    bit (32) OCRResolution;
    bit (8) timeStampLength; // must be ≦ 64
    bit (8) OCRLength; // must be ≦ 64
    bit (8) AU_Length; // must be ≦ 32
    bit (8) instantBitRateLength;
    bit (4) degradationPriorityLength;
    bit (5) AU_seqNumLength: // must be ≦ 16
    bit (5) packetSeqNumLength: // must be ≦ 16
    bit (2) extension_field_control/
  }
  if (durationFlag) {
    bit (32) timeScale;
    bit (16) accessUnitDuration;
    bit (16) compositionUnitDuration;
  }
  if (useTimeStampFlag) {
    bit (timeStampLength) startDecodingTimeStamp;
    bit (timeStampLength) startCompositionTimeStamp;
  }
  if (extension_field_control=0h10)
  {
    MarkerDescriptor (0..1) markerDescriptors;
    DependencyDescriptor (0..255) dependencyDescriptors;
  }
    dependencyMarkerscount=0
    while(true)
    {
      bit(1) hasMoreMarkers;
      if (!hasMoreMarkers) break;
      DependencyMarker
    dependencyMarkers[dependencyMarkersCount++];
    }
    dependencyDescriptorCount =0;
    while(true)
    {
      bit(1) hasMoreDependencyDescriptor;
      if (!hasMoreDependencyDescriptor) break;
      DependencyDescriptor dependencyDescriptor
    [dependencyDescriptor++];
    ]
  ]
```

Semantics

The SL packet header can be configured according to the needs of each individual elementary stream. The parameters that can be selected include the presence, resolution, and accuracy of time stamps, as well as clock references. This flexibility allows, for example, a small increase of the SL packet header contents.

For each elementary stream, the configuration is transmitted in an SLConfigDescriptor, which is part of the ES_Descriptor associated to an object descriptor.

The parameters that can be configured in the SL packet header can be divided into two types: those that are applied to each SL packet (for example, OCR, sequenceNumber) and those that are only displayed in the access units (for example: time stamps, accessUnitLength, instantBitrate, degradationPriority, etc.)

The—predefined—column allows fixing the default values of a set of predefined parameters, such as those detailed below. This table can be updated by the ISO/IEC 14496 amendments to include predefined settings such as those required for future profiles.

TABLE 1

View of the Set of SLConfigDescriptor predefined values

| Predefined value field | Description |
|---|---|
| 0x00 | Customers (custom) |
| 0x01 | Null SL packet header |
| 0x02 | Reserved for use in MP4 fields |
| 0x03-0xFF | Reserved for ISO use |

TABLE 2

Detail of SLConfigDescriptor Predefined Values

| Predefined value field | 0x01 | 0x02 |
|---|---|---|
| UseAccessUnitStartFlag | 0 | 0 |
| UseAccessUnitEndFlag | 0 | 0 |
| UseRandomAccessPointFlag | 0 | 0 |
| UsePaddingFlag | 0 | 0 |
| UseTimeStampFlag | 0 | 1 |
| UseIdleFlag | 0 | 0 |
| DurationFlag | 0 | 0 |
| TimeStampResolution | 1000 | — |
| OCRResolution | — | — |
| TimeStampLength | 32 | 0 |
| OCRLength | — | 0 |

TABLE 2-continued

Detail of SLConfigDescriptor Predefined Values

| Predefined value field | 0x01 | 0x02 |
|---|---|---|
| AU_Length | 0 | 0 |
| InstantBitRateLength | — | 0 |
| DegradationPriorityLength | 0 | 0 |
| AU_seqNumbLength | 0 | 0 |
| PacketSeqNumLength | 0 | 0 |
| UseAccessUnitStartFlag | 0 | 0 |
| UseAccessUnitEndFlag | 0 | 0 |
| UseRandomAccessPointFlag | 0 | 0 |
| UsePaddingFlag | 0 | 0 |
| UseTimeStampFlag | 0 | 1 |
| UseIdleFlag | 0 | 0 |
| DurationFlag | — | 0 |
| TimeStampResolution | 1000 | — |
| OCRResolution | — | — |
| TimeStampLength | 32 | 0 |
| OCRLength | — | 0 |
| AU_Length | 0 | 0 |
| InstantBitRateLength | — | 0 |
| DegradationPriorityLength | 0 | 0 |
| AU_seqNumbLength | 0 | 0 |
| PacketSeqNumLength | 0 | 0 |
| TimeScale | — | — |
| AccessUnitDuration | — | — |
| CompositionUnitDuration | — | — |
| StartDecodingTimeStamp | — | — |
| StartCompositionTimeStamp | — | — | useAccessUnitStartFlag—indicates that the accessUnitStartFlag is present in each SL packet header of this elementary stream.

useAccessUnitEndFlag—indicates that the accessUnitEndFlag is present in each SL packet header of this elementary stream.

If neither useAccessUnitStartFlag nor useAccessUnitEndFlag are enabled, this means that each SL packet corresponds to a complete access unit.

useRandomAccessPointFlag—indicates that the RandomAccessPointFlag is present in each SL packet header of this elementary stream.

hasRandomAccessUnitsOnlyFlag—indicates that each SL packet corresponds to a random access point. In this case, the randomAccessPointFlag does not need to be used.

usePaddingFlag—indicates that the paddingFlag is present in each SL packet header of this elementary stream.

useTimeStampFlag—indicates that the time stamps are used for synchronising this elementary stream. They are transported in the SL packet header. Otherwise, the accessUnitRate, compositionUnitRate, startDecodingTimestamp, and startCompositionTimeStamp parameters transported in this SL packet header must be used for synchronisation.

The use of start and duration time stamps (useTimeStampFlag=0) is only possible under certain conditions, including in an environment without errors. Random access is not easy.

useIdleFlag—indicates that the idleFlag is used in this elementary stream.

durationFlag—indicates that the constant duration of the access units and the composition units for this elementary stream is subsequently indicated.

timeStampResolution—the time base resolution of the object in by-second pulses.

OCRResolution—the time base resolution of the object in by-second cycles timeStampLength—the length of the time stamp fields in the SL packet header. timestampLength must take on the values from zero to 64 bits.

OCRlength—the length of the objectClockReference field in the SL packet header. Several zeros indicates that no objectClockReference is present in this elementary stream. If the OCRstreamFlag is placed, OCRLength must be zero. Otherwise, OCRlength must take on the values between zero and 64 bits.

AU_Length—the length of the accessUnitLength fields in the SL packet header for this elementary stream. AU_Length must take on a value between zero and 32 bits.

instantBitrateLength—the length of the instantBitrate in the SL packet header of this elementary stream.

degradationPriorityLength—the length of the degradationPriority field in the SL packet header of this elementary stream.

AU_SeqNumLength—the length of the AU_sequenceNumber field in the SL packet header of this elementary stream.

packetSeqNumLength—the length of the packetSequenceNumber field in the SL packet header of this elementary stream.

timeScale—used to indicate the duration of the access units and composition units. A second is also divided into timeScale sections.

accessUnitDuration—the duration of a composition unit is compositionUnitDuration*1/timeScale seconds.

compositionUnitDuration—the duration of a composition unit is compositionUnitDuration*1/timeScale seconds.

startDecodingTimeStamp—transports the time in which the first access unit of this elementary stream must be decoded. It is transported in the resolution specified by timeStampResolution.

extension_field_control—this field allows extending the SL. The value 01b0 indicates that the descriptors must be placed at the end of the SLConfigDescriptor.

markerDescriptors—this table indicates a description of markers for identifying the next access units in the stream.

dependencyDescriptors—this table indicates the dependency descriptors that specify how the previous access units or the next units must be referenced.

MarkerDescriptor

The syntax is the following:

```
class MarkerDescriptor extends BaseDescriptor : bit (8)
tag=DependencyMarkerTag {
    int(5) encodedMarkerLength;
    MarkerLength= encodedMarkerLength + 1;
}
```

DependencyDescriptor
Syntax

```
abstract class DependencyDescriptor extends
BaseDescriptor (
);
class SimpleDependencyDescriptor extends BaseDescriptor :
bit (8)
tag=SimpleDependencyTag (
    bit(2) mode;
    bit(5) dependencyLength;
    if (mode==1|| mode==0)
    {
        bit (dependencyLength) firstvalue;
    }
);
class CompleteDependencyDescriptor extends BaseDescriptor
: bit (8)
```

```
tag=CompleteDependencyTag (
  bit(2) mode;
  bit(16) ESID;
  bit(5) dependencyLength;
  if (mode==1|| mode==0)
  {
    int (dependencyLength) firstvalue;
  }
);
```

Mode

There are four modes defined:

Mode 0: reference to front by DTS

Mode 1: reference to front by Marker

Mode 2: back scalability reference

Mode 3: IPMP mode

Modes 0 and 1 force each access unit to reference the next access unit.

Mode 2 forces each access unit to reference the previous access unit that is needed for decoding this access unit. (Note: In several cases, more than two dependencydescriptors are necessary for referencing two or more required access units.)

Mode 3 allows each access unit to contain an opaque identifier that can be used by the IPMP system to decide whether the decoding and composition of this access unit is possible.

Modes 1 and 3 require a MarkerDescriptor in the stream.

ESID

This optional field identifies the stream to which the DependencyDescriptor references.

For SimpleDependencyDescriptor, ESID is calculated in the following manner:

Modes 0 and 1: the current stream

Modes 2: depending on dependsOnESID

Modes 3: not applicable dependencyLength—the length of either the marker (if present) or the decodingTimeStamp.

value—the value of the first marker or the identifiers of the next access unit to decode.

SL Packet Header Specification

Syntax

```
aligned(8) class SL_PacketHeader (SLConfigDescriptor SL)
{
  if (SL.useAccessUnitStartFlag)
    bit(1) accessUnitStartFlag;
  if (SL.useAccessUnitEndFlag)
    bit(1) accessUnitEndFlag;
  if (SL.OCRLength>0)
    bit(1) OCRflag;
  if (SL.useIdleFlag)
    bit(1) idleFlag;
  if (SL.usePaddingFlag)
    bit(1) paddingFlag;
  if (paddingFlag)
    bit(3) paddingBits;
  if (!idleFlag && (!paddingFlag _ paddingBits!=0)) {
    if (SL.packetSeqNumLength>0)
      bit (SL.packetSeqNumLength)
  packetSequenceNumber;
    if (SL.degradationPriorityLength>0)
      bit(1) DegPrioflag;
    if (DegPrioflag)
      bit(SL.degradationPriorityLength)
  degradationPriority;
    if (OCRflag)
      bit(SL.OCRLength) objectClockReference;
    if (accessUnitStartFlag) {
      if (SL.useRandomAccessPointFlag)
        bit(1) randomAccessPointFlag;
      if (SL.AUseqNumLength >0)
        bit(SL.AU_seqNumLength) AU_sequenceNumber;
      if (SL.useTimeStampsFlag) {
        bit(1) decodingTimeStampsFlag;
        bit(1) compositionTimeStampFlag;
      }
      if (SL.instantBitrateLength>0)
        bit(1) instantBitrateFlag;
      if (decodingTimeStampFlag)
        bit(SL.timeStampLength) decodingTimestamp;
      if (compositionTimeStampFlag)
        bit(SL.timeStampLength) compositionTimeStamp;
      if (SL.AU_Length > 0)
        bit (SL.AU_Length) accessUnitLength;
      if (instantBitrateFlag)
        bit (SL.instantBitrateLength) instantBitrate;
    }
  }
  if (SL.hasMarker && beginningOfAU())
  {
    for (int I-O, I< markerDescriptorcount;I++)
    (
      bit(marker.length) markervalue
    )
  )
  for (int I=0; I< dependencyDescriptorCount;I++)
  [
    if (dependencyDescriptor.mode>>1 ==0)
    (
      bit (dependencyDescriptor[I].depLength)
  dependencyPointerValue;
    )
  }
}
```

Semantics accessUnitStartFlag—when equal to one, it indicates that the first byte of the load for this SL packet is the start of a unit access. If this syntax element is omitted from the configuration of the SL packet header, its default value is known from the previous SL packet according to the following rule:

accessUnitStartFlag=(the *SL* packet before accessUnit EndFlag=1)?1:0.

accessUnitEndFlag—when equal to one, it indicates that the last byte of the load for this SL packet is the last byte of the current access unit. If this syntax element is omitted from the configuration of the SL packet header, its default value is only known after receipt of the SL packet, according to the following rule:

accessUnitEndFlag=(the *SL* packet after accessUnit-StartFlag=1) ?1:0

If neither AccessUnitStartFlag nor AccessUnitEndFlag are configured in the SL packet header, it means that each SL packet corresponds to a single access unit, in which each accessUnitStartFlag=accessUnitEndFlag=1.

Note that, when the SL packet header is configured to use accessUnitStartFlag but not accessUnitEndFlag nor accessUnitLength, there is no guarantee that the terminal will be able to determine the end of an access unit before the next one is received.

OCRflag—when equal to one, it indicates that an object-ClockReference will follow. The default value for OCRflag is zero.

idleFlag—indicates that this elementary stream will be inactive (that is, absent of desired data) for an undetermined amount of time. This sign can be used by the decoder to distinguish between a deliberate absence and an absence due to an error in the subsequent SL packets.

paddingFlag—indicates the data completion mode to be used in this SL packet. The default value for paddingFlag is zero.

paddingBits—indicates the data completion mode to be used in this SL packet. The default value for paddingBits is zero.

If paddingFlag is placed and paddingBits is equal to zero, this indicates that the subsequent load of this SL packet consists only of completion bytes. accessUnitStartFlag, randomAccessPointFlag and OCRflag must not be placed if paddingFlag is placed and paddingBits is zero.

If paddingFlag is placed and paddingBits is greater than zero, this indicates that the load of this SL packet is followed by. paddingBits, formed of zero bits for aligning the bytes of the load.

packetSequenceNumber—if present, it must be continuously increased for each SL packet as a module counter. A discontinuity in the decoder corresponds to one or several missing SL packets. In this case, an error must be indicated at to the synchronisation layer. If this syntax element is omitted from the configuration of the SL packet header, the control of the continuity of the stream units by the synchronisation layer cannot be done for this elementary stream.

SL Packet Duplication: the elementary streams that have a sequenceNumber field in their SL packet headers must use the duplication of SL packets for error recovery. The duplicated SL packet(s) must immediately follow the original. The packetSequenceNumber of duplicated SL packets must have the same value and each byte of the original SL packet must be duplicated, with the exception of an objectClockReference field, if present, which must encode the valid value for the duplicated SL packet.

degPrioFlag—when equal to one, it indicates that degradationPriority is present in this packet.

degradationPriority—indicates the importance of the load of this SL packet. The streamPriority defines the base priority of an ES. degradationPriority defines a priority decrease for this SL packet with respect to the base priority. The priority for this SL packet is given by:

SL_PacketPriority=streamPriority−degradationPriority degradationPriority maintains this value until the next occurrence. This indication can be used by the elementary stream decoder as well as the adapter for an instance of a specific distribution layer. The proportion of degradation among the SL packets of the various elementary streams increases as the SL_PacketPriority decreases.

objectClockReference—contains an object time stamp. The OTR t time value is reconstructed from this OCR time stamp according to the following formula:

$$t=(objectClockReference/SL.OCRResolution)+ K*(2^{SL.OCRLength}/SL.OCRResolution)$$

where k is the time that the objectClockReference counter has covered.

objectClockReference is only present in the SL packet header if OCRflag is placed.

Only one OCR value can be transported without loading the inside of the SL packet.

Described below are the semantics of the syntax elements that are only present at the beginning of an access unit when indicated specifically by accessUnitStartFlag in the binary stream:

randomAccessPointFlag—when equal to one, it indicates that the random access to the contents of this elementary stream is possible. randomAccessPointsFlag must only be placed if accessUnitStartFlag is placed. If this syntax element is omitted from the configuration of the SL packet header, its default value is the SLConfigDescriptor.hasRandomAccess UnitOnlyFlag value for this elementary stream.

AU_sequenceNumber—if present, it must be continually increased for each access unit as a module counter. A discontinuity at the decoder corresponds to one or several missing access units. In this case, the error must be indicated to the user of the synchronisation layer. If this syntax element is omitted from the configuration of the SL packet header, the control of the continuity of the stream units by the synchronisation layer cannot be executed for this elementary stream.

Duplication of access units: the access units sent using the same number of sequences than the AU immediately before must be ignored. Such a duplicate access unit, whose original does not have RAP placed, but the duplicate units does, allows adding random access points to the transmitted stream. This allows clients to enter into the stream at defined points, during its transmission, while other clients already receive the stream.

decodingTimeStampFlag—indicates that a decoding time stamp is present in this packet.

compositionTimeStampFlag—indicates that a time stamp composition is present in this packet.

accessUnitLengthFlag—indicates that the length of this access unit is present in this packet.

instantBitrateFlag—indicates that an instantBitrate is present in this packet.

decodingTimeStamp—a decoding time stamp, such as that configured in the related SLConfigDescriptor. The decoding time td of this access unit is reconstructed from this time decoding stamp according to the following formula:

$$td=(decodingTimeStamp/SL.timeStampResolution+ K*2^{SL.timstampLength}/SL.timeStampResolution$$

where k is the time that the decodingTimeStamp counter has covered.

A decodingTimeStamp must only be present if the decoder time is different from the time composition for this access unit.

compositionTimeStamp—a time stamp composition such as that configured in the related SLConfigDescriptor. The time composition tc of the first composition unit results from the fact that this access unit is reconstructed from the time stamp composition according to the following formula:

$$td=(compositionTimestamp/SL.timeStampResolution+k*2^{SL.timeStampLength}/SL.timeStampResolution$$

where k is the time that the compositionTimeStamp counter has covered.

accessUnitLength—the length of the access unit in bytes. If this syntax element is not present or has a value of zero, the length of the access unit is unknown.

instantBitrate—the instantaneous bit rate in bits per second of this elementary stream until the next instantBitrate field is found.

markerValue—the value of a marker that allows identifying the access unit. This marker is defined if markerDescriptor exists.

DependecyPointerValue—a DTS or marker index as defined by the DependencyDescriptor.

MarkerDescriptorCount: the number of marker descriptors.

DependencyDescriptorCount: the number of dependent descriptors.

Decoding Semantics

Front Reference Mechanism (Modes 0 and 1)

The SLConfigDescriptor related to an ES indicates the first access unit that allows entering into the stream.

If the reference mode is DTS, then the SLConfigDescriptor must contain a decodingTimeStamp.

Otherwise, a marker is used to mark each access unit. 0 and −1 have a special significance:

//0 means that no more access units will follow

//−1 means that any access unit can be used.

Each access unit must contain a marker and a dependencypointer that allows each access unit to indicate the next access unit.

Rear Reference Mechanism (Mode 2)

The SLConfigDescriptor will define n DependencyDescriptor type descriptors that will indicate the access units in the ES that ESID references.

Each access unit of the current stream will point the access units over the ES whose identifier is ESID, called ES_base, using the DependencyPointers as reference to the ES_base access units (identified by ESID) through their DTS.

IPMP Mode (Mode 3)

The DependencyPointers are transmitted to the IPMP system before decoding. This opaque pointers allow the IPMP resources to decide whether it is possible or not to decode the access unit. It can respond in the negative if the keys have not been received or if the rights do not allow it. This dependency pointer is linked to the composition unit after decoding.

It is returned to the IPMP system before composition, the IPMP resources will then decide if the unit can be present or not.

Clock Reference Stream

A streamType=ClockReferenceStream elementary stream must be declared using the objector descriptor. It is used for transporting the object clock reference time stamps. Multiple elementary streams in a name set can reference such a ClockReferenceStream using the OCR_ES_ID syntax element in the SLConfigDescriptor to prevent the repeated transmission of the clock reference information. Nevertheless, it should be noted that circular references between elementary streams using OCR_ES_ID are not allowed.

On the synchronisation layer, a ClockReferenceStream is performed by configuring the syntax of the SL packet header for the packaged stream at the SL level so that only the required OCR values of the OCRResolution and OCRLength are present in the SL packet header.

There is no SL packet charge present in a packaged stream-SL of streamType=ClockReferenceStream In the DecoderConfigDescriptor for a clock reference stream, ObjectTypeIndication must be placed on '0xFF', hasRandomAccessUnitsOnlyFlag over one and bufferSizeDB over '0'.

Indicated below are the recommended values for the SLConfigDescriptor of a clock reference stream:

TABLE 3

SLConfigDescriptor Values of the
SLConfigDescriptor Parameters of a ClockReferenceStream

| | |
|---|---|
| useAccessUnitStartFlag | 0 |
| useAccessUnitEndFlag | 0 |
| useRandomAccessPointFlag | 0 |
| usePaddingFlag | 0 |
| useTimeStampsFlag | 0 |
| useIdleFlag | 0 |
| useIdleFlag | 0 |
| durationFlag | 0 |
| timeStampResolution | 0 |
| timeStampLength | 0 |
| AU_length | 0 |
| degradationPriorityLength | 0 |
| AU_seqNumLength | 0 |

Restrictions for Elementary Streams that Share the same Time Base Object

When a time base object can be shared between several elementary streams through OCR_ES_ID, a number of restrictions for accessing these elementary streams and their processing exist, as follows:

When several elementary streams share a simple time base object, the elementary streams without integrated clock reference information must not be used by the terminal, even if they are accessible, until the elementary stream transporting the object clock reference information becomes accessible.

If an elementary stream without integrated clock reference becomes available to the terminal after the elementary stream that transports the object clock reference information, it must be delivered in synchronisation with the other stream(s.) Note that this implies that such a stream must not be delivered from the beginning, depending on the current value of the time base object.

When an elementary stream transporting object clock reference information becomes unavailable or is used elsewhere (for example, in standby mode,) all the other elementary streams that use the same time base object must follow this approach; that is, they must become unavailable or be manipulated in the same direction.

When an elementary stream without integrated object clock reference information becomes unavailable, this does not affect the other elementary streams that share the time base object.

Using the Configuration Options for Clock References and Time Stamp Values

Resolving the Ambiguity in the Recovery of a Time Base Object

Depending on the limited length of the objectClockReference values, these time stamps can be ambiguous. The OTB time value can be reconstructed each time that an objectClockRference is transmitted in the SL packet headers, according to the following formula:

$$t_{OTB\_reconstructed} = (\text{objectClockReference}/ SL.OCR\text{Resolution}) + k*(2^{SL.OCRLength}/ SL.OCR\text{Resolution})$$

where k is a whole value indicating the number of loops. The resulting time base $t_{OTB\_reconstructed}$ is measured in seconds.

When the first objectClockReference for an elementary stream is acknowledged, the k value must be set to one. For each subsequent occurrence of objectClockReference, the k value is estimated as follows:

The terminal must understand the resources for estimating the value of the time base object at each instant.

Each time that an objectClockReference is received, the estimated current value of OTB $t_{OTB\_estimated}$ must be sampled. Therefore, $t_{OTB\_res}(K)$ is evaluated for different values for k. The k value that minimises the duration $|t_{OTB\_estimated} - t_{OTB\_rec}(k)|$ must be considered as the correct value for $t_{OTB\_reconstructed}$. This value must be used as a new contribution to the time base object estimation mechanism.

The application must ensure that this procedure produces a non ambiguous value for k by selecting an appropriate length and resolution for the objectClockReference element and a sufficiently high frequency of objectClockReference insertion values in the elementary stream. The choice for this value depends on the delivery jitter for the SL packets, as well as the maximum expected lag between the clocks of the terminal and the receiver.

Resolving the Ambiguity in the Recovery of the Time Stamp

Depending on the limited length of the decodingTimeStamp and compositionTimeStamp values, these time stamps can become ambiguous, as indicated by the following formula:

$$T_{ts}(m) = (\text{TimeStamp}/SL.\text{timeStampResolution}) + m * (2^{SL.timeStampLength}/SL.\text{timeStampResolution})$$

where TimeStamp is either a decodingTimeStamp or a compositionTimestamp and m is the whole value that indicates the number of loops.

The correct $t_{timestamp}$ value of the time stamp can be estimated as follows:

Each time that a TimeStamp is received, the current estimated value of OTB $t_{OTB\_estimated}$ must be sampled. $t_{ts}(m)$ is evaluated for the various values for m. The m value that minimises the term $|t_{OTB\_estimated} - t_{ts}(m)|$ is considered as the correct value for $t_{timestamp}$.

The application can choose, independently for each individual elementary stream, the length and resolution of the time stamps, in order to meet the requirements regarding the non ambiguous positioning of time events. This choice depends on the maximum time during which an SL packet with a TimeStamp can be sent, after the moment indicated by the TimeStamp, as well as the requested accuracy of the time positioning.

Remarks Regarding the Use of Object Clock References and Time Stamps

The time line of an object base time allows distinguishing two separate instants by more than the /SL.OCRResolution. OCRResolution must be chosen with a sufficiently large size to allow obtaining the accuracy required by the application for synchronising a set of elementary streams.

The time and composition stamps allow distinguishing two individual instants separated by more than the /SL.timeStampResolution. timeStampResolution must be chosen with a size sufficiently large to allow obtaining the accuracy required by the application in terms of obtaining the access units for a given elementary stream.

A TimeStampResolution that is greater than the OCRResolution will not allow obtaining the best discrimination between events. If TimeStampResolution is less than OCRResolution, the events for this specific stream cannot be obtained with the maximum accuracy possible with this given OCRResolution.

The OCRLength parameter is indicated in the configuration of the SL header. $2^{SL.OCRLength}$/SL.OCRResolution is the time interval covered by the objectClockReference counter before it loops. A sufficiently high OCRLength must be chosen in order to meet the needs of the application for a non ambiguous positioning of time events for all elementary streams.

When the application knows the k value defined above, the OTB time line is clear for each time value. When the application cannot reconstruct the k factor, for example, in the case of an application that allows random access without additional information, the OTB time line is made ambiguous for mode $2^{SL.OCRLength}$/SL.OCRResolution. Thus, each time stamp referring to this OTB is ambiguous. Nevertheless, it can be considered clear within an application environment using the knowledge that the supposed maximum jitter and constraints on the duration in which an access unit can be sent before it is decoded.

It should be noted that the elementary streams that choose a time interval $2^{SL.timeStampLength}$/SL.timeStampResolution greater than $2^{SL.OCRLength}$/SL.OCRResolution can only obtain, in an unambiguous manner, the time events in the smallest of the two time intervals.

In some cases, when k and m cannot be correctly estimated, the buffer model can be transgressed, which leads to unexpected operations and results by the decoder.

For example, in considering an application that wishes to synchronise the elementary streams with an accuracy of 1 ms, OCRResolution must be chosen as equal or greater than 1000 (the time between two consecutive OCT pulses is therefore equal to 1 ms.) It can be assumed that OCRResolution=2000.

The application supposes a jitter between the STB and the OTB of 0.1% (that is, 1 ms per second.) The clocks must therefore be adjusted at least every second (that is, in the worst case scenario, that the clocks deviate 1 ms, which is the accuracy constraint.) It can be supposed that the objectclockReference are sent every 1 s.

The application may want to have a clear OTB time line of 24 h without needing to reconstruct the factor k. The OCRLength is therefore chosen as a result, as with $2^{SL.OCRLength}$/SL.OCRResolution=24 h.)

Suppose now that the application wishes to synchronise the events inside an elementary stream, except with an accuracy of 10 ms. TimeStampResolution must be chosen as equal to or greater than 100 (the time between two consecutive pulses of TimeStamp is therefore equal to 10 ms). Suppose that TimeStampResolution=200.

The application wishes the capacity to send access units at a maximum of one minute before their decoder or composition times. The timeStampLength is therefore chosen as $2^{SL.timeStampLength}$/SL.timeStampResolution=2 minutes.

The invention claimed is:

1. Transmission procedure comprising:
   generating at least one data stream for transmission to at least one terminal, each of said stream or streams being made of access units, wherein at least some of said access units include at least one pointer that points to at least one other access unit of said stream or of another stream that may have been received previously in the terminal, called a required previous unit, so that processing of said access unit is not performed in said terminal if the required previous unit or units have not been received, and wherein said pointer is a dependency pointer, the dependency pointer being distinct from any sequence number said access unit may have and being included in a dependency descriptor of said access unit, said dependency descriptor describing said dependency pointer; and
   transmitting the at least one data stream to the at least one terminal.

2. Transmission procedure according to claim 1, wherein the procedure includes the transmission of at least two data streams that are transmitted independently; one access unit of a first stream pointing to at least one required previous unit of at least a second stream, in which said access unit of the first stream includes enrichment data of the data contained in the second stream(s).

3. Transmission procedure according to claim 2, wherein said data streams correspond to different hierarchical levels of hierarchical encoding, the processing of a access unit of a given hierarchical level is only performed if the access units of the corresponding lower hierarchical levels have been received.

4. Transmission procedure according to claim 2, wherein this access unit points to at least one previous unit defining a sequence of required previous units.

5. Transmission procedure according to claim 1, wherein at least one of said pointers allows recovering at least one required previous unit that includes the data allowing decoding and/or decrypting of the considered access unit.

6. Transmission procedure according to claim 5, wherein said required previous unit or units include data that allows the terminal to decide whether the data of a considered access unit must be decoded and/or decrypted, and then displayed after decoding.

7. Transmission procedure according to claim 1, wherein at least one of said pointers point to data that can be known by said terminal, so that the latter can decide on its capacity or incapacity to process the corresponding access unit.

8. Transmission procedure according to claim 1, wherein at least one of said access units includes at least one pointer pointing to at least one access unit of said stream or another stream that may be subsequently received.

9. Transmission procedure according to claim 8, wherein said access unit or units that can be subsequently received posses a marker that allows linking with said pointer(s).

10. Transmission procedure accordingly to claim 8, wherein the pointers of at least two similar access units transmitted at distinct times point to the same access unit that can be subsequently received.

11. Transmission procedure according to claim 1, wherein the procedure implements an indicator that specifies the role of the pointer(s) from among two of the roles belonging to the groups that include:
designation of at least one previous access unit that must be decoded to allow taking into account the considered access unit;
designation of at least one previous access unit that includes the data necessary for decoding and/or decrypting the considered access unit, and/or of a reference to a status of the protection system; and
designation of at least one subsequent access unit.

12. Transmission procedure according to claim 11, wherein at least some of said access units include a dependency descriptor, which defines said role.

13. Transmission procedure according to claim 1, wherein at least some of said access units include a dependency marker that allows its identification as a required previous unit.

14. Transmission procedure according to claim 1, wherein at least some of said access units include an identification marker of said access unit in said stream.

15. Transmission procedure according to claim 1, wherein the procedure is implemented at the synchronization level so that no previous processing of a received access unit is necessary.

16. A method comprising:
producing a stream of data, wherein the stream is made of access units transmitted independently one from the other, wherein at least some of said access units include at least one pointer that points to at least one other access unit of said stream or another stream that may have been received previously in a terminal, called a required previous unit, so that processing of said access unit is not performed in said terminal if the required previous unit has not been received, and wherein said pointer is a dependency pointer, the dependency pointer being distinct from any sequence number said access unit may have and being included in a dependency descriptor of said access unit, said dependency descriptor describing said dependency pointer; and
transmitting the stream to the at least one terminal.

17. A server for data designed to be transmitted to at least one terminal, in the form of at least one data stream made of access units transmitted independently from each other, wherein at least some of said access units include at least one pointer that points to at least one other access unit of said stream or another stream that may have been received previously in the terminal, called a required previous unit, and wherein said pointer is a dependency pointer, the dependency pointer being distinct from any sequence number said access unit may have and being included in a dependency descriptor of said access unit, said dependency descriptor describing said dependency pointer.

18. A terminal that can receive at least one data stream made of access units transmitted independently from each other, wherein at least some of said access units include at least one pointer that points to at least one other access unit of said stream or another stream that may have been received previously in the terminal, called a required previous unit, and wherein said pointer is a dependency pointer, the dependency pointer being distinct from any sequence number said access unit may have and being included in a dependency descriptor of said access unit, said dependency descriptor describing said dependency pointer.

19. A reception procedure comprising receiving at least one data stream made of access units, transmitted independently from each other, wherein at least some of these access units include at least one pointer that points to at least one other access unit of said stream or another stream that may have been received previously in a terminal, called required a previous unit, and wherein said pointer is a dependency pointer, the dependency pointer being distinct from any sequence number said access unit may have and being included in a dependency descriptor of said access unit, said dependency descriptor describing said dependency pointer.

20. Reception procedure according to claim 19, wherein at least one of said pointers points to at least one access unit of said stream or another stream that may have been received previously in a terminal, called required previous unit, and in that it includes the following stages:
analysing said pointer(s) of a access unit; and
processing said access unit if the required previous unit or units are received.

21. The transmission procedure according to claim 1 and comprising a step of using said transmission procedure in one of the applications belonging to the group consisting of:
systematic broadcasting of a message before accessing a program selected by the user;
conditional access at a specific quality level and/or at a specific option of a program; and
interactive television.

22. A processing method of at least one audio visual data stream, each of said stream or streams being made of stream units, wherein said method comprises the steps of:
receiving said stream or streams with a terminal, wherein at least some of said stream units include at least one pointer which designates at least one other stream unit of said stream or of another stream that may have been received previously in the terminal, called a dependency unit, said dependency unit being an access unit, the pointer being distinct from any sequence number said access unit may have; and
processing said stream or streams unless said at least one dependency unit has not been received.

* * * * *